Patented Dec. 11, 1923.

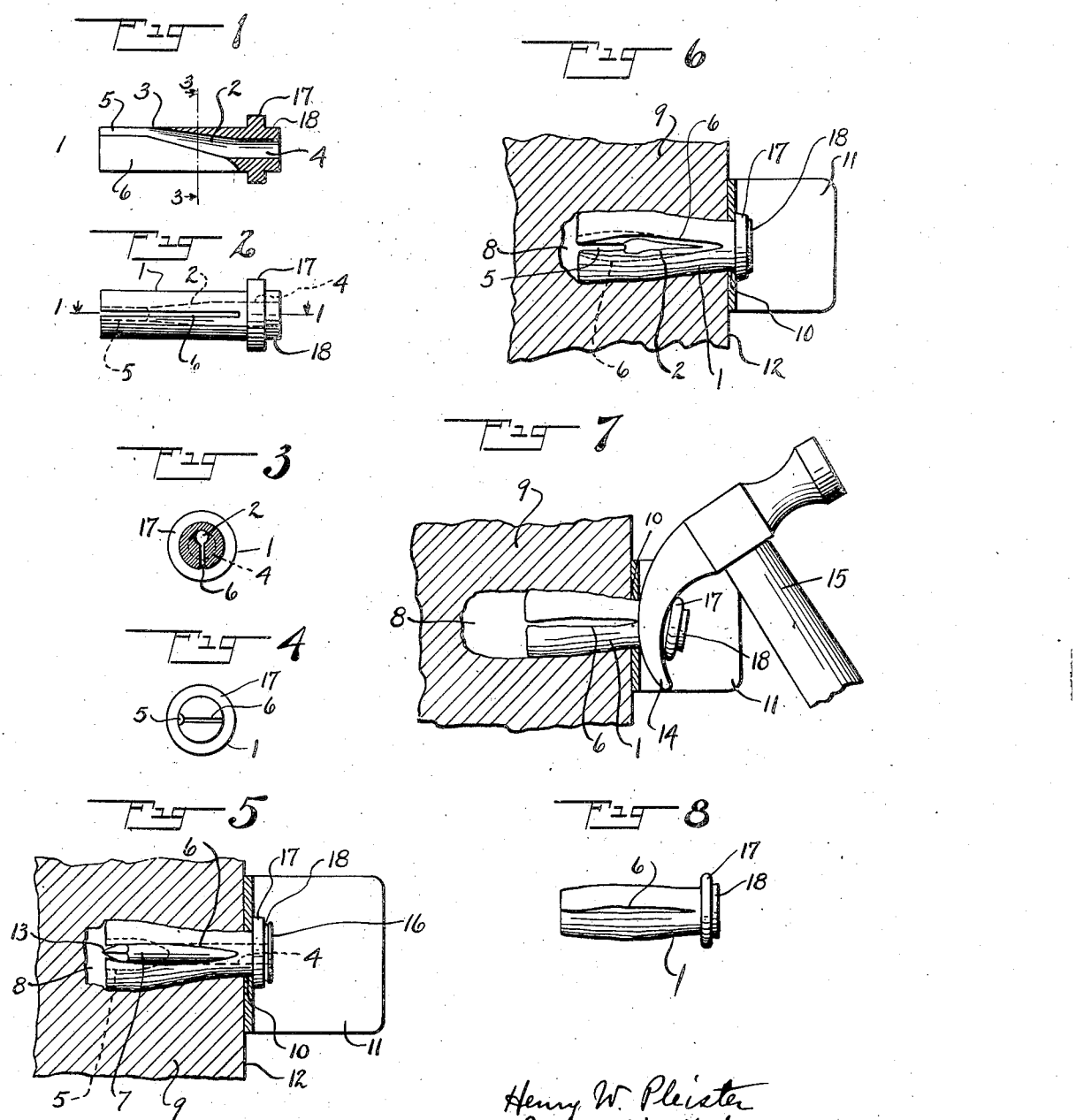

1,476,837

UNITED STATES PATENT OFFICE.

HENRY W. PLEISTER, OF WESTFIELD, AND JOHN KARITZKY, OF GARWOOD, NEW JERSEY, ASSIGNORS TO HENRY B. NEWHALL, OF PLAINFIELD, NEW JERSEY.

NAIL FASTENER.

Application filed January 29, 1923. Serial No. 615,630.

*To all whom it may concern:*

Be it known that we, HENRY W. PLEISTER, a citizen of the United States, residing at Westfield, in the county of Union and State of New Jersey, and JOHN KARITZKY, a citizen of the United States, residing at Garwood, in the county of Union and State of New Jersey, have made certain new and useful Improvements in Nail Fasteners, of which the following is a specification taken in connection with the accompanying drawings.

Our invention relates to a nail fastener which can be used repeatedly, without breaking, to secure different work or objects to a wall or other suitable support.

In nail fasteners now in use, particularly in those in which the body member is formed of ductile material, it is practically impossible to withdraw the nail fastener from the wall or other suitable support, to substitute a new object or new work for the old, without breaking the nail fastener and leaving some portion of it within the hole. It requires considerable labor to remove the broken portion from the hole before a new nail fastener can be used to support the new object or work, by being expanded in the same hole.

Our nail fastener can be readily expanded by simply driving in the nail, and can also be readily withdrawn from the hole without breaking; it being simply necessary to first remove the nail, and then later the nail fastener.

Our invention relates to certain articles of manufacture, combinations and details of construction to be more fully hereinafter described and pointed out in the claims.

In the accompanying drawing we have illustrated one embodiment of our invention, but it of course is to be understood that our invention is not to be confined simply to the form illustrated. In these drawings the same reference numerals refer to similar parts in the several figures.

Fig. 1 is a vertical section through our nail fastener substantially on the line 1—1 of Fig. 2;

Fig. 2 is a plan view of the nail expansion rotated 90° from the position shown in Fig. 1;

Fig. 3 is a cross-section on the line 3—3 of Fig. 1;

Fig. 4 is an end view of Fig. 2.

Fig. 5 is a horizontal section through a wall and the work supported, showing the nail and nail expansion in plan;

Fig. 6 is a horizontal section the same as Fig. 5, after withdrawing the nail, and prior to withdrawing the nail fastener;

Fig. 7 is a horizontal section, simlar to Fig. 6, showing one manner of withdrawing the nail fastener from the hole;

Fig. 8 is a plan view of the nail fastener after it has been withdrawn from the hole.

In certain classes of construction work it is desirable, and sometimes essential, that a nail fastener should be capable not only of giving an adequate grip or bond within the hole in the wall or other suitable support, but it should also be capable of being removed to permit an old attachment, previously held by the nail fastener, to be replaced by a new one. While of course we use the word attachment we mean any work or object which is to be supported and held to the wall or other suitable support by the nail fastener. Ductile nail fasteners now in use can only be withdrawn by use of a claw hammer or a pair of heavy diagonal pliers, or some similar tool, that will engage underneath the head of the nail so as to withdraw the nail. Then some suitable tool has to be used to withdraw the ductile nail fastener. In all the ductile nail fasteners now in use it is almost impossible to withdraw them from the wall, to substitute a new bracket or other work, without breaking off a portion of the nail fastener, leaving a part of it in the wall or other suitable support, usually in firm contact with the surface of the hole in the wall. Before a new nail expanison can be used to support a new bracket or other work in the same hole, it is necessary to remove the broken part of the old nail fastener. This is often very troublesome and very laborious work.

By our invention we form a nail fastener out of ductile or other material which will not only expand readily within the hole to make a firm and secure grip or bond, but in addition our nail fastener can be readily withdrawn from the hole in a wall or other suitable support and used again, without breaking the nail fastener. This saves the expense of using a new nail fastener and the labor of extracting broken portions of the old fastener from the hole.

Our nail fastener 1 may be formed of any suitable material, such as lead, an alloy, aluminum, brass, malleable iron, or any other suitable material, which will readily expand to make a secure grip within the hole, and yet can be readily compressed and withdrawn from the hole without breaking. Preferably we form our nail fastener 1 of ductile material, as for example, lead or an alloy, forming it substantially cylindrical and provide it with an oblique bore 2, which extends to the periphery 3 of the nail fastener 1. At the very end of the nail fastener we preferably have a central longitudinal bore 4, which is concentric with the longitudinal axis of the nail fastener and merges into the oblique bore 2, which, as previously noted, extends to the periphery of the nail fastener forming an opening 5. We also preferably provide a nail fastener with a longitudinal slot 6 which permit the ready expansion of the nail fastener when the nail 7 is driven into it.

In using our nail fastener 1, after the hole 8 is drilled or otherwise formed in the wall or other suitable support 9, it is inserted, for example, in an opening 10 in a bracket or other suitable work 11 which is to be firmly held to the surface 12 of the wall or other suitable support 9, and the nail fastener is then located within the hole 8. To firmly secure the work 11, it is simply necessary to drive the nail 7 through the axial bore 4 and the oblique bore 2, when the slot 6 will readily expand, permitting the parts to be forced into their expanded position which is shown in Fig. 5 somewhat exaggerated for purposes of illustration. The end 13 of the nail 7 is preferably driven into the nail fastener 1 so that it will emerge from the oblique bore 2 and pass out of the opening 5 and bear directly upon the interior surface of the hole 8. In this manner the bracket 11, or other work, is securely held in position.

In certain classes of construction work as previously noted, it is desirable from time to time, during the course of months or years, to substitute a new bracket or other work 11 for the old one. It is then necessary to remove the nail fastener so as to permit this substitution.

In our invention the nail 7 is first removed by placing the claw 14 of a claw hammer 15, or any other suitable tool, beneath the head 16 of the nail. After the nail has been withdrawn the parts are as shown in Fig. 6. To withdraw the expanded nail fastener 1 from the position shown in Fig. 6 it is necessary to pull it out of the hole 8 by some suitable tool, as for example the claw 14 shown in Fig. 7. This withdrawal from the hole 8 will compress or collapse the expanded nail fastener as shown in Fig. 7 without breaking it. The nail fastener after it is withdrawn from the hole 8 is shown in Fig. 8, and is ready to be used again to secure a new bracket or other work 11 to the wall or other suitable support 9.

In addition to the elements that we have previously described we preferably, though not necessarily, provide our nail fastener with a flange 17 and also with a ductile head 18. The flange 17 serves as a stop to prevent the nail fastener being inserted too far into the hole and also as a more or less yielding bearing surface to engage with the work. In those cases in which we employ a ductile head 18, it being understood that this head may be omitted without departing from our invention, the head of the nail 16, by repeated blows from a hammer will upset the ductile head and make it a compressible bearing surface between the head of the nail and the nail fastener.

Having thus described this invention in connection with an illustrative embodiment thereof, to the details of which we do not desire to be limited, what is claimed as new and what is desired to secure by Letters Patent is set forth in the appended claims.

What we claim is:—

1. An article of manufacture comprising a nail fastener having an expansible body provided with means to permit it to expand as a nail is driven into it and also provided with an inclined bore extending to the periphery of the expansible body.

2. An article of manufacture comprising a nail fastener having a body formed of ductile material provided with weakening means to permit the body member to expand and also provided with an inclined bore extending to the periphery of the expansible body.

3. The combination in a nail fastener of a body member provided with an inclined bore and means to permit the body member to be expanded by a nail to bind the nail fastener in a hole and to permit it to contract when the fastener is withdrawn from the hole.

4. The combination in a nail fastener of a body member provided with an inclined bore extending to the periphery of the body member and means to permit the body member to be expanded by a nail to bind the nail fastener in a hole and to permit it to contract when the fastener is withdrawn from the hole.

5. The combination in a nail fastener of a body member provided with an inclined bore and with a slot to permit the body member to be expanded by a nail to bind the nail fastener in a hole and to permit it to contract when the fastener is withdrawn from the hole.

6. The combination in a nail fastener of a body member provided with an inclined bore extending to the periphery of the body member and with a slot to permit the body member to be expanded by a nail to bind the nail fastener in a hole and to permit it to contract when the fastener is withdrawn from the hole.

7. The combination in a nail fastener of a body member formed of ductile material provided with an inclined bore extending to the periphery of the body member and with a slot to permit the body member to be expanded by a nail, to bind the nail fastener in a hole but to permit the nail fastener to contract if the fastener is withdrawn from the hole.

8. An article of manufacture comprising a nail fastener having a flange, an expansible body having an inclined bore extending to the surface or periphery of the expansible body.

9. An article of manufacture comprising a nail fastener formed of ductile material having a flange, an expansible body having an inclined bore extending to the surface or periphery of the expansible body.

10. An article of manufacture comprising a nail fastener formed of ductile material having a flange, an expansible body having a inclined bore extending to the surface or periphery of the expansible body the body member being provided with a ductile head adapted to be upset.

11. The combination of a nail fastener having an expansible body member provided with means to permit it to expand and provided with an inclined bore extending to the periphery of the body member and a nail to expand the expansible body member as it is driven into said body.

12. The combination of a nail fastener formed of ductile material having an expansible body member provided with means to permit it to expand and provided with an inclined bore extending to the periphery of the body member and a nail to expand the expansible body member as it is driven into said body.

13. The combination of a nail fastener formed of a ductile body member having an inclined bore extending to the periphery of the body member and a slot to permit the body member to be readily expanded by a nail driven into it and to be readily collapsed upon withdrawing the nail fastener and a nail.

14. The combination of a nail fastener formed of a ductile body member having a flange and an inclined bore extending to the periphery of the body member and a slot to permit the body member to be readily expanded by a nail driven into it and to be readily collapsed upon withdrawing the nail fastener and a nail.

15. The combination of a nail fastener formed of a ductile body member having a flange, a ductile head, and an inclined bore extending to the periphery of the body member and a slot to permit the body member to be readily expanded by a nail driven into it and to be readily collapsed upon withdrawing the nail fastener and a nail adapted to expand the body member and contact with the ductile head and upset it.

HENRY W. PLEISTER.
JOHN KARITZKY.

Witnesses:
MARY R. RYAN,
ANNA M. WILLIAMS,
FREDERICK W. KARITZKY,
FRANK B. PERRY.